March 3, 1964  H. W. MUMBY  3,122,872
FLEXIBLE CABLE WINDING MACHINE
Filed Sept. 24, 1962  6 Sheets-Sheet 1

INVENTOR.
Herald W. Mumby
BY George E. Johnson
ATTORNEY

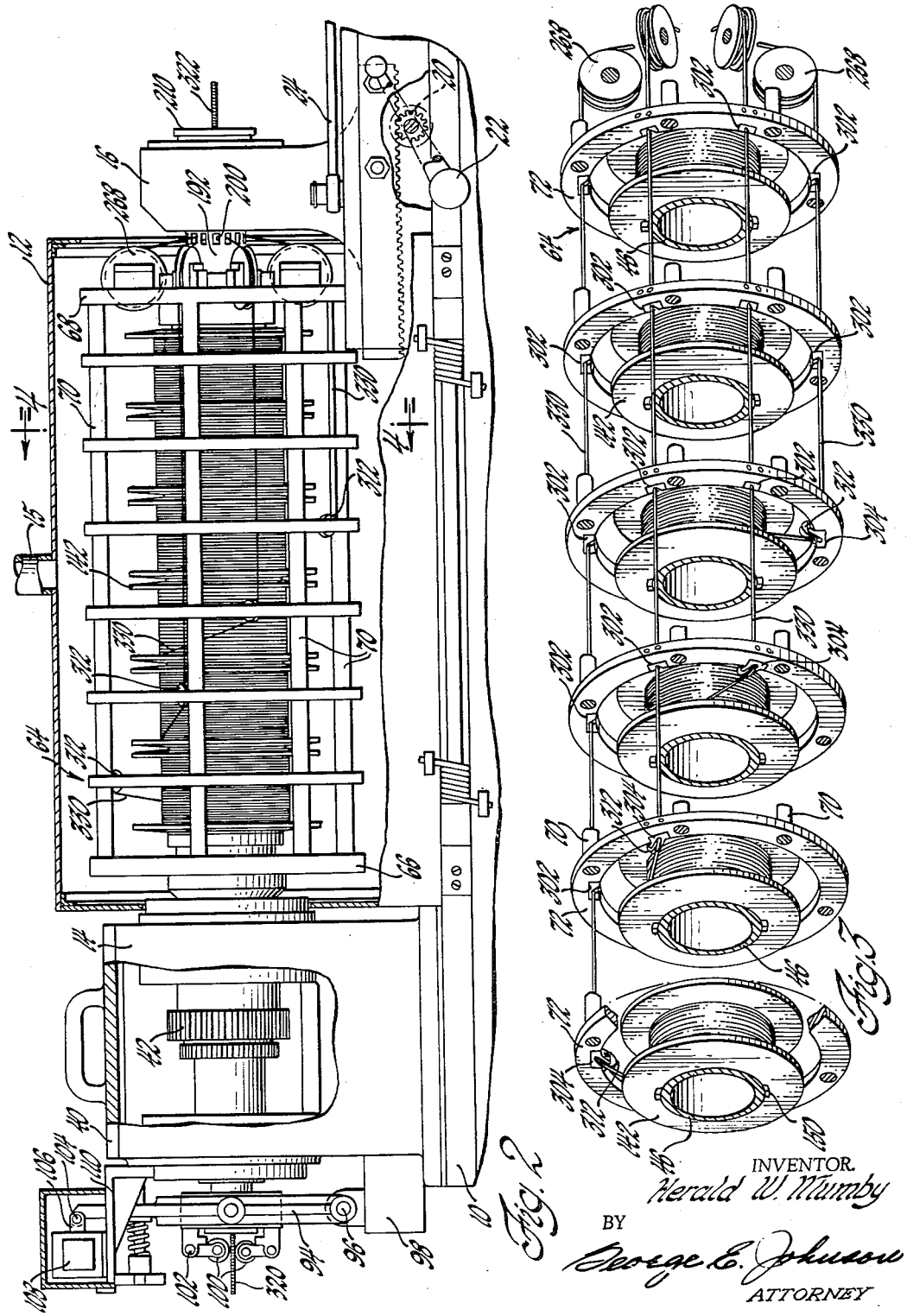

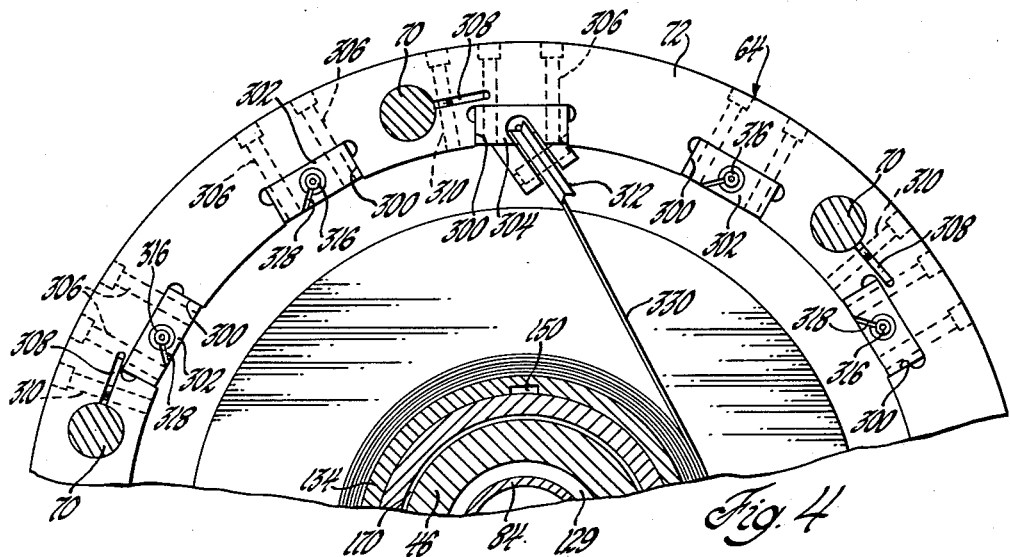
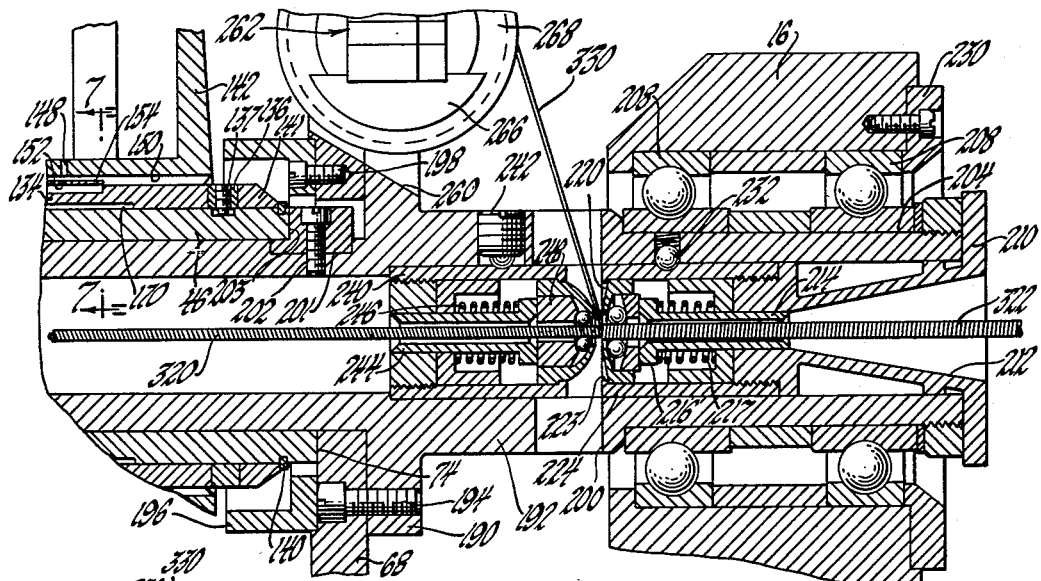
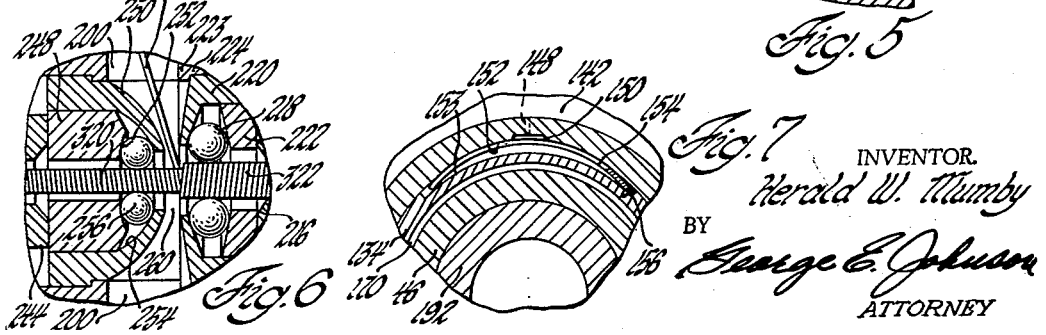

March 3, 1964 H. W. MUMBY 3,122,872
FLEXIBLE CABLE WINDING MACHINE
Filed Sept. 24, 1962 6 Sheets-Sheet 4
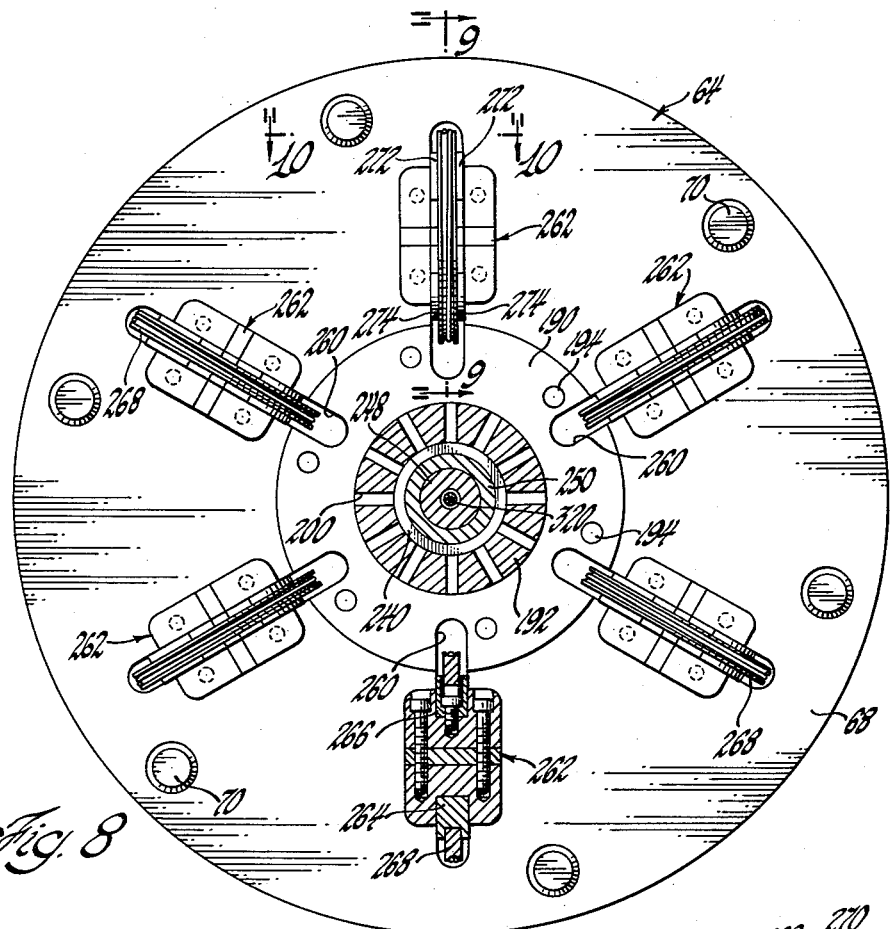
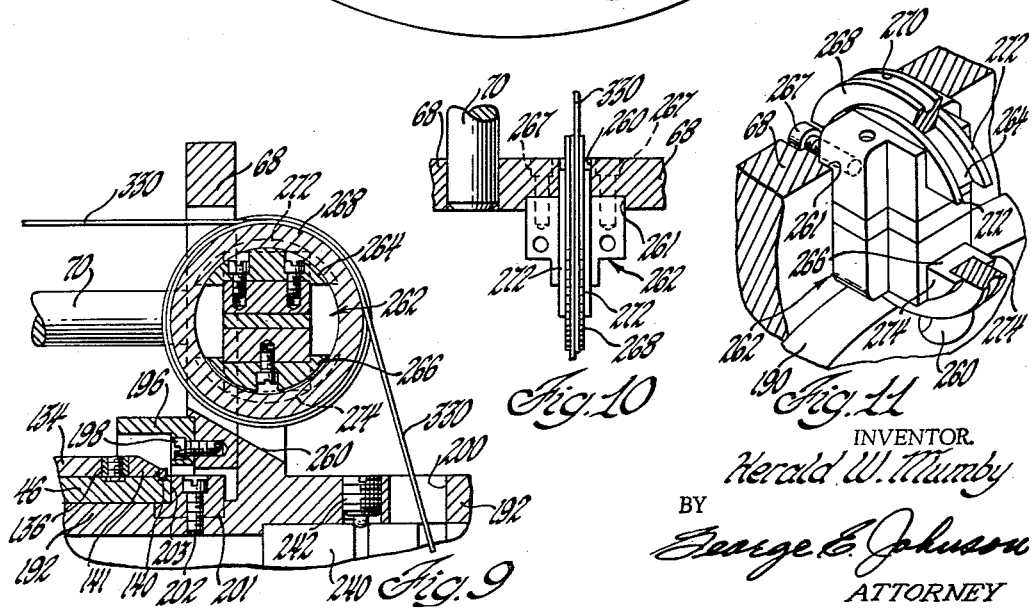
INVENTOR.
Herald W. Mumby
BY
George E. Johnson
ATTORNEY

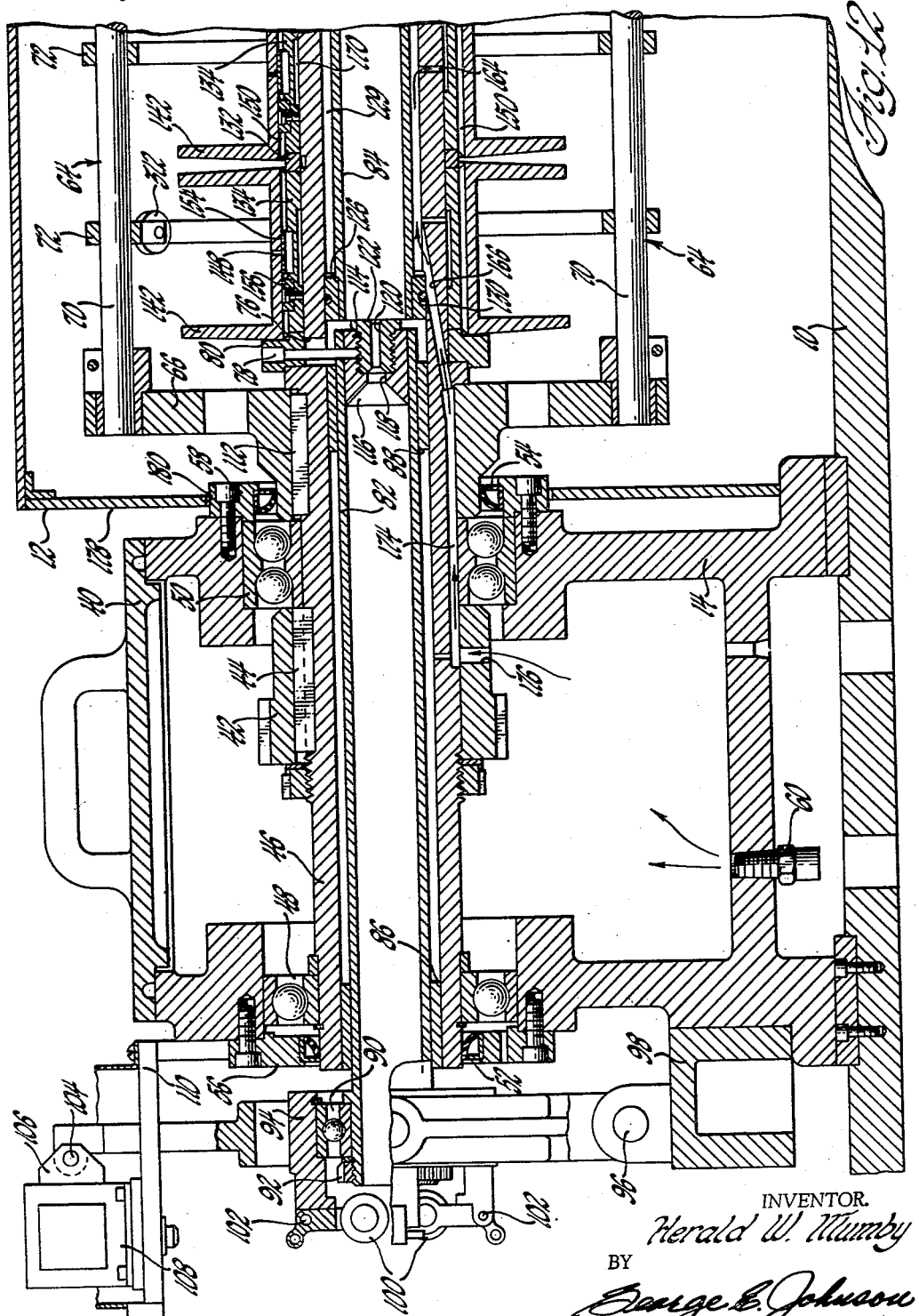

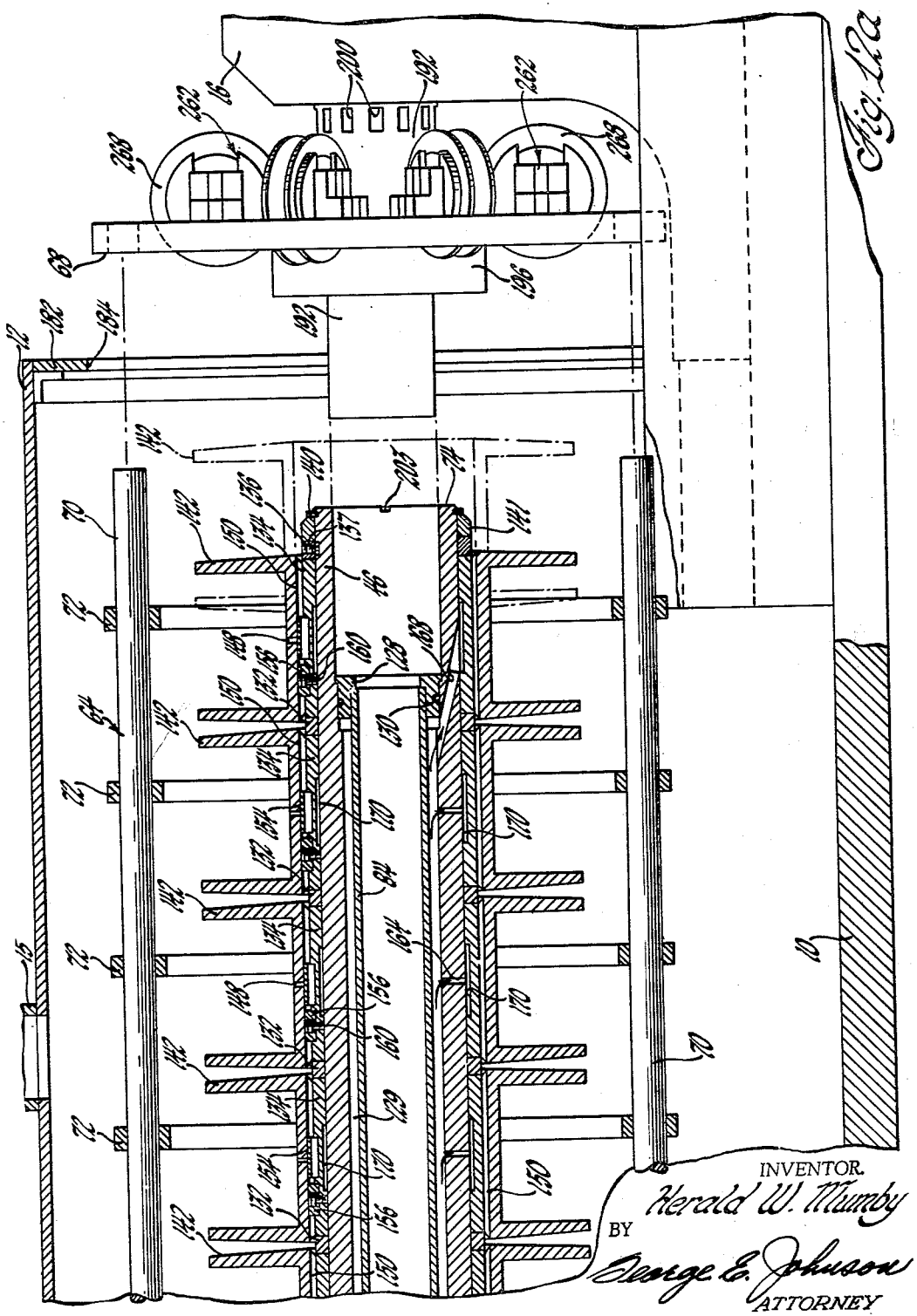

United States Patent Office 3,122,872
Patented Mar. 3, 1964

3,122,872
FLEXIBLE CABLE WINDING MACHINE
Herald W. Mumby, Flint, Mich., assignor to General Motors Corporation, Detroit, Mich., a corporation of Delaware
Filed Sept. 24, 1962, Ser. No. 225,558
21 Claims. (Cl. 57—17)

This invention pertains to flexible cable winding machines and more particularly to machines for winding multiple layers of wire strands over a central core to obtain a flexible cable suitable for driving or operating devices such as speedometers and push-pull controls useful in automobiles and other fields.

Heretofore machines for this purpose have required great skill in their operation in order to maintain proper tension in the wire layers during the winding operation. This tension must be uniform and carefully controlled if the cable produced is to be of high quality and able to withstand flexing and torsional stresses during use. Cables of the type herein considered may be as disclosed in the United States Patent No. 1,952,301, granted March 27, 1934, in the name of H. W. Webb and entitled "Flexible Shaft." Such a cable or shaft comprises a central core in the form of a flexible strand having coils superposed on that central core with the adjacent layers being wound thereon in alternately opposite directions. Not only must the tension be uniform and controlled in each length of cable produced but the tension should not be affected by stopping and starting the winding machine or by refilling the machine with the necessary multiple strands as large scale cable production requirements are met or as great unitary lengths of cable are made.

An object of the present invention is to provide an improved machine for winding flexible cable in the use of which a minimum of operator skill is required to gain high production capacity of a cable product of high quality and also a cable of great length when required.

An important feature of the present invention is a tension ring structure on a rotative spindle, this structure being such as automatically to determine and automatically regulate proper strand tensioning for a cable winding operation. Another feature is an improved cable winding head through which a core strand may be fed for the winding of a layer of strands such as wire thereon. Another feature is a spindle housing equipped with oil mist circulation provisions for lubricating the core, strands and machine components. Still another feature is an improved spindle structure including removable bobbins for supporting supplies of wire or strands to be led to a winding head.

These and other important features of the invention will now be described in detail in the specification and then pointed out more particularly in the appended claims.

In the drawings:

FIGURE 2 is an enlarged elevational view of a part of the machine shown in FIGURE 1, certain portions being broken away;

FIGURE 3 is a perspective and exploded view of parts of a spindle shown in FIGURES 1 and 2;

FIGURE 4 is an enlarged sectional view looking in the direction of the arrows 4—4 in FIGURE 2;

FIGURE 5 is an enlarged sectional view of a spinning head shown in FIGURE 2;

FIGURE 6 is a detail view of portions of the head shown in FIGURE 5 and drawn to a larger scale;

FIGURE 7 is a sectional view looking in the direction of the arrows 7—7 in FIGURE 5;

FIGURE 8 is an enlarged sectional view looking in the direction of the arrows 8—8 in FIGURE 1;

FIGURE 9 is a sectional view looking in the direction of the arrows 9—9 in FIGURE 8;

FIGURE 10 is a sectional view looking in the direction of the arrows 10—10 in FIGURE 8;

FIGURE 11 is a perspective view of a tensioning ring structure and a portion of a spindle supporting the ring structure, sections being broken away; and FIGURES 12 and 12a taken together represent a spindle housing and supporting structure with portions in section showing oil mist provisions and illustrating structures permitting removal and refilling of bobbins.

Figure 1:
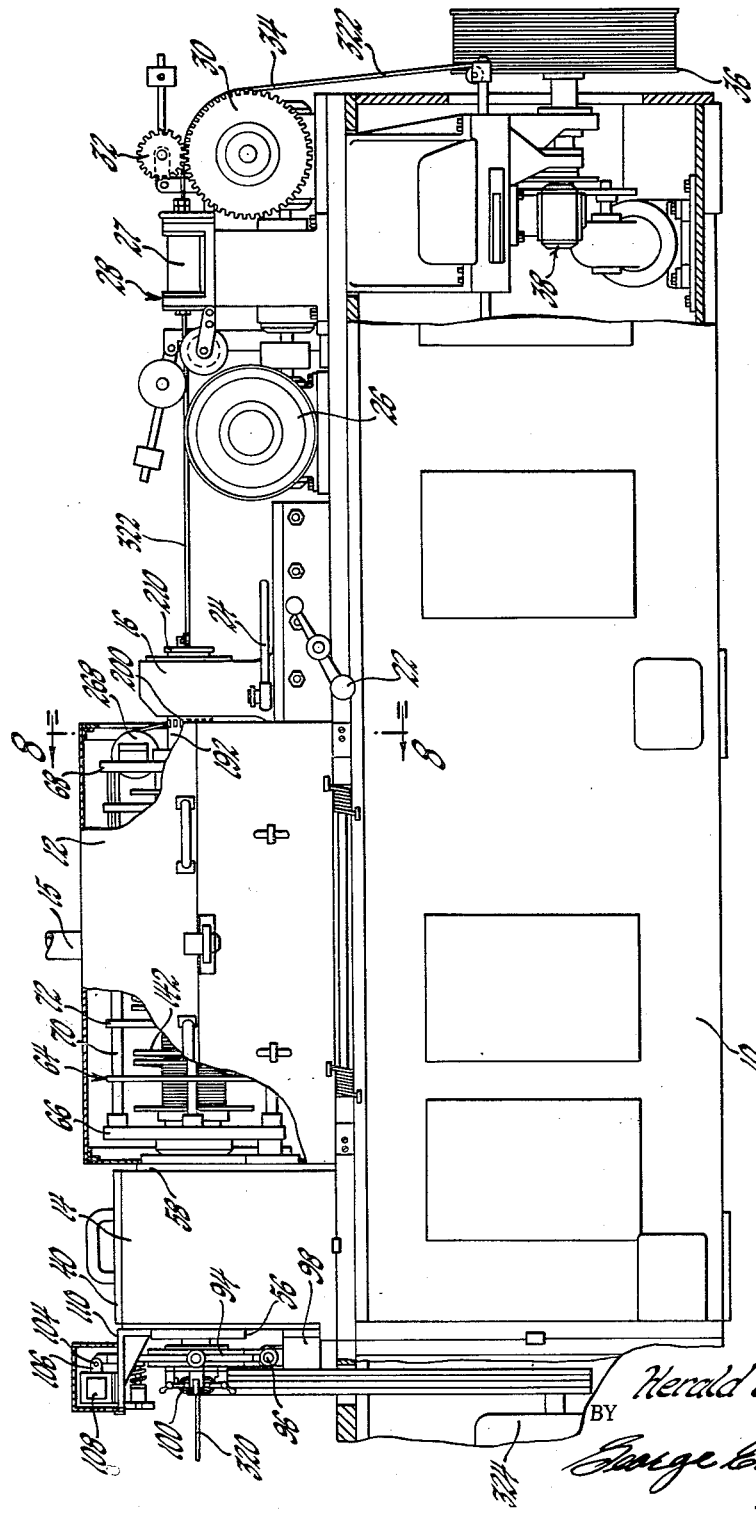
FIGURE 1 is an elevational view of one stage or final machine of a series of similar machines for winding cable in which stage or machine the present invention is embodied, parts being broken away for ease of illustration.

The machine depicted in the drawings is the last machine or stage in a series of in-line machines used in producing a multi-layer cable. Except for minor changes in design dimensions necessary as each machine changes the diameter of the work fed through it, it will be understood that each machine of the series is preferably similar to the last machine and that each machine is adapted to wind one layer of strands about the core fed to that machine. The core is fed straight through the series of machines while the core is under a predetermined tension. The first machine winds a number of strands about a single strand core to form a first layer of two to four or more wires. The second machine winds a series of strands about the product of the first machine to form a second layer of two or more wires. The third machine places a third layer of multiple strands on the partially completed cable and the final or fourth machine illustrated places an outer layer of six strands on the cable. It will be understood that the last machine is enabled to place two or up to six strands in the outer or final layer it produces. The machine shown in the drawings is provided with six bobbins and this indicates as the description proceeds that a six-strand layer may be placed on the cable by that particular machine.

The core of the cable, whether it be the central core strand alone as in the first machine of the series or the core and three layers as fed into the third machine of the series, is maintained under uniform and carefully controlled tension at all times and is simultaneously given a definite rate of feed. Various mechanisms may be used at the inlet and discharge ends of the series of machines insuring that this tension and rate of feed are maintained. These mechanisms are not parts of the present invention and are not specifically disclosed herein as they may take various forms. Advantageously, but not necessarily, the prime movers for the machine are D.C. controlled eddy-current electric motors. They may be accurately controlled as to speeds and torques and do not rely on frictional devices. Acceleration and deceleration of the motors under constant torque are also controllable making them suitable for feeding the cable core and motivating the winding spindle.

In FIGURE 1, the final stage or machine is depicted as being mounted on a base 10 with a spindle housing 12 on its top, a gear housing 14 at one end of the housing 12 and a movable block 16 at the other end of the housing 12. The block 16 is adjustable toward and away from the housing 12 by means of a rack and gear arrangement 20 best shown in FIGURE 2. This arrangement may be operated by a hand crank 22. The block 16 is adjusted in the same manner as the tail stock of a lathe and may be locked in any position by means of a locking handle 24.

Also mounted on the base 10 is a power driven capstan 26 and cooperating with that capstan is a straightening mechanism depicted at 28. The latter comprises a guide 27, a toothed wheel 30 meshing with another weighted toothed wheel 32 firmly to grasp a finished cable discharged from the machine and indicated at 34. The peripheral speed of the wheel 30 is made slightly greater than the peripheral speed of the capstan 26 as will be set forth hereinafter. The cable 34 extends downwardly upon discharge from the wheel 30 and is received on a windup spool or drum 36 which is power operated by a power mechanism 38.

The housing 14 is provided with a removable cover 40 and encloses suitable gearing a portion of which is indicated at 42 and which is keyed as at 44 (FIGURE 12) to a sleeve 46. The latter is journaled in ball bearings 48 and 50 retained by opposite walls of the housing 14. Oil seals 52 and 54 are retained by means of plates 56 and 58 respectively to form seals surrounding the sleeve 46 adjacent to the bearings 48 and 50.

A means for generating an oil mist for lubrication purposes is located in the base 10 and is not disclosed in the drawings but it will be appreciated that such generating means may take various forms. This oil mist is utilized in the present machine to lubricate the bearings, the strands and cable core as well as bobbins and other parts of the machine. After generation, the oil mist is fed up from the base 10 and by means of a connection 60 it is admitted to the chamber within the housing 14 thereby giving lubrication to the bearings 48 and 50 as well as to the gearing in the housing 14. An oil mist exhaust vent is provided at 15. Many elements are lubricated by the mist as will be apparent as the description proceeds.

A major portion of the sleeve 46 extends from the bearing 50 and the housing 14. It is capable of supporting a multi-bobbin carrying spindle which is illustrated generally at 64 as being housed within the housing 12. The spindle comprises two end disks 66 and 68. These are apertured at their peripheral margins to receive six evenly spaced and parallel rods 70. One end of each of the rods is fixed to the disk 66 and the other ends of the rods are slidable within the disk 68. Six rings 72 are also apertured to receive the rods 70 and these rings are spaced at substantially equal increments between the end plates 66 and 68. The sleeve 46 is of substantial length extending, as it does, from the seal 52 (FIGURE 12) and through the housing 14 to terminate at an end surface 74 as shown in FIGURE 12a. This sleeve bears a slot 76 (FIGURE 12) intermediate its length and through which a key member 78 radially extends. This key member itself passes through an annulus 80 and through the slot 76 into engagement with an inner core guiding tube 82. This tube is coaxial with a second tube 84 mounted within the sleeve 46. The tube 82 is carried in two bushings 86 and 88 held within the sleeve 46. One end of the guiding tube 82 extends outwardly from the sleeve 46 and is journaled in a ball bearing 90. The extreme end of the tube 82 bears a gear 92 adapted to be driven by gearing, not shown in the drawings. The ball bearing 90 is mounted in a yoke member 94 which is pivoted on a horizontal shaft 96. The latter is mounted on a support 98 fastened to the housing 14. Guide wheels 100 are pivotally mounted to the yoke 94 as at 102. Only two guide wheels are shown in FIGURE 12 but four of these are used and are equally spaced around a central passage coaxial with the tube 82 for guiding a cable core. The upper end of the yoke 94 is pivoted as at 104 to the armature 106 of a solenoid 108. The latter is mounted on a shelf 110 placed in fixed relation with the housing 14. A spring (not shown) serves to place the armature 106 in one position when the solenoid is not energized and when the solenoid is energized the spring is compressed. The range of axial movement of the tube 82 is within a few thousandths of an inch. The end plate 66 of the spindle 64 is keyed as at 112 to the sleeve 46. The inner end of the tube 82 bears a plug 114 and this plug has a conical opening 116 leading into a passage 118. Coaxial with the passage 118 is a smaller passage 120 formed in a threaded insert 122.

The tube 84 is nonrotatably held within the sleeve 46 by means of two annuli 126 and 128 to define an oil mist gallery 129. Each of the annuli is provided with an O-ring 130 thereby effecting seals with the inside surface of the sleeve 46. It will be noted that the supporting annulus 128 is spaced inwardly a short distance from the end surface 74 of the sleeve 46 as best seen in FIGURE 12a.

Five spaced steel collars 132 are arranged on the sleeve 46. These collars serve to separate six bronze bushings 134. The ring 80 (FIGURE 12) abuts one end bronze bushing 134 and a steel ring 136 abuts a bronze bushing 134 adjacent the end surface 74 of the sleeve 46. The ring 136 is retained on the sleeve by a spring retainer 140 and an annulus 141. Each of the collars 132 and the ring 136 may move axially as permitted by a screw such as shown at 137 in FIGURE 5.

As stated above, the spindle 64 is built to accommodate six bobbins. Each of these bobbins is indicated by the reference number 142 and comprises a cylindrical drum apertured as at 148. Each bobbin bears diametrically opposite slots 150 (FIGURES 7 and 12) running in the direction of its axis and is also formed with an arcuate groove 152 in which is retained the intermediate part of a leaf spring 154. The latter is held in place at one end in a registering groove 153 of a bronze bushing 134 by means of a screw 156 threaded into the bushing. The leaf spring 154 is of such width as snugly but movably to fit within the grooves 152 and 153. A driving block 156 is held by means of a screw 160 to each bronze bushing 134. This block is such as to fit slidably within either of the diametrically opposed grooves 150.

Under the tube 84 the sleeve 46 bears a number of spaced apertures 164. These together with three passages 166 (FIGURE 12) and one passage 168 (FIGURE 12a) serve to lubricate the bearing surfaces of the bobbin as provided by the bronze bushings. To implement this lubrication each bronze bushing 134 bears an inner annulus recess 170 served by one of the apertures 164. The passage 166 communicates with a gallery 174 (FIGURE 12) formed in the sleeve 46 and passes through the gear 42. Communication between the gallery 174 and the interior of the housing 14 is by way of a radial passage 176 formed in the gearing 42.

One end wall 174 of the spindle housing 12 encircles the sealing plate 58 with a slight clearance 180 therebetween. An opposite end wall 182 is formed with a large opening 184 permitting horizontal movement of the end plate 68 from or into the housing upon operation of the block 16 in turning the crank 22. FIGURE 12a shows the block 16 and associated parts including a winding head as withdrawn from the spindle housing 12 whereas FIGURES 1, 2 and 5 show those elements in their operative positions. The spindle disc 68 is part of this linearly movable assembly.

A circular flange 190 is integrally formed intermediate the length of a hollow winding head shaft 192. The spindle disc 68 is fixed to the flange 190 by means of six screws 194 and a strengthening or reinforcing ring 196 is fixed to the disc 68 by a number of screws such as the screw 198. When the winding head is in operative position the ring 196 clears the parts 141, 136, as best seen in FIGURE 5. The hollow shaft 192 bears multiple radial slots 200 which are located just clear of one side of the block 16. When the disc 68 abuts the surface 74 of the sleeve 46 the rods 70 of the spindle are received in the spindle disc 68 and a key member 201 held to the shaft by a screw 202 engages a notch 203 in the sleeve 46. One end of the hollow shaft 192 is reduced in diameter as at 204 and a set of ball bearings 208 is retained on this reduced portion by means of an end element 210. The latter bears a conical outlet 212 and is telescopically arranged with respect to the shaft 192 and a guide sleeve or plunger 214. The latter bears a head 216 and a coil spring 217 is utilized to bias the sleeve 214 toward the spindle 64. Ball bearings 218 are held between two apertured members 220 and 222 which are slidable with respect to each other. The member 220 is restrained against movement toward the spindle by means of a shoulder 223 formed on a cylinder 224 in which the members 220 and 222 are held. The opposing surfaces of the element 220 and 222 are conical and converge outwardly toward each other as best seen in FIGURE 6. The bearing set 208 is held in place in the block 16 by a retaining ring 230 and a spring pressed ball detent 232 in the hollow shaft 192 detachably holds the cylinder 224 and its associated parts in position.

A second cylinder 240 is held in the hollow shaft 192 by a detent device 242 and this cylinder is fitted with a sleeve or plunger 244 biased by a coil spring 246 toward a slidable member 248. The latter is slidable within an apertured element 250 so that two curved surfaces 252 and 254 face each other and retain ball bearings 256 between them. A predetermined space 260 (FIGURE 6) is maintained between the two elements 220 and 250 when the winding head assembly is complete. It will be noted that the balls 218 are larger than the balls 256 and this is because the core fed into the machine illustrated is increased in diameter by one layer of wire as it passes through the space 260.

Spaced around the hollow shaft 192 and passing through th flange 190 and the spindle end plate 68 are six radial slots 260 (FIGURE 8). Each of these slots is enlarged as at 261 (FIGURE 10) and adapted to receive a block arrangement as generally indicated at 262 and which includes two bronze shoes 264 and 266. Bolts 267 hold the block arrangement in position. This block arrangement forms bearing surfaces for a tension ring 268 and is fixed in position on the disc 68 of the spindle 64. The ring is made with a peripheral groove 270 and is held within opposed flanges 272 and 274 of the bronze shoes 264 and 266 respectively. The weight of the tensioning ring 268 is carefully calculated to effect proper tensioning of a strand being handled by that ring. This matter will be described more fully hereinafter in setting forth the mode of operation.

Each of the six rings 72 of the spindle 64 bears evenly spaced and inwardly facing recesses 300 (FIGURE 4) each of which is provided with a block 302 or 304 held in position by bolts 306. Each ring 72 is also slotted as at 308 permitting the use of a bolt 310 in firmly attaching the ring to one of the six rods 70. For each bobbin 142, an encircling ring 72 has one block 304 fitted with a sheave 312 inclined to the radius of the ring 72 at such an angle as generally to conform with the strand take-off angle from the particular bobbin. FIGURES 2 and 3 best illustrate the disposition of four of the sheaves 312. The blocks 302 in the ring 72 adjacent to the end plate 68 of the spindle must be five in number in the machine illustrated. The next ring 72 requires four, the next three, and so on with the ring 72 at the other end of the spindle requiring only one block 304 with a sheave 312. FIGURE 4 shows one ring 72 having one block 304 with its sheave 312. More blocks 302 are placed in each ring 72 than are required for a six bobbin machine as the machine is designed to handle more or less than six bobbins 142 on a spindle 64 and the rings 72 may be adjusted in their axial positions. Each block 302 is apertured as at 316 for the reception and guidance of a strand supplied by one bobbin. An oblique slot 318 is also provided in each block 302 to facilitate threading of the bobbin strands into the blocks 302.

In appreciating technical problems involved in developing this machine and their solutions, it should be realized that the ultimate product—wound multi-layer cable—is in the neighborhood of ⅛ of an inch in over-all diameter and comprises a core strand of steel or nylon and four superposed layers of strands of wire each layer having two or more individual strands. The machine illustrated in the drawings is adapted to apply six strands as the outer layer to a previously wound cable core indicated at 320.

The final product is shown at 322 and is received on the drum or windup spool 36. The completed cable may be continuously withdrawn from the drum 36 and passed through a tempering chamber to relieve internal stresses. Further description of this tempering aspect is not given herein as it forms no part of the present invention.

It will also be appreciated that the driving motor portion indicated at 324 in FIGURE 1 and the tensioning machine 28 as well as the drive means 38 for the drum 36 must all be operated at a carefully controlled speed. The spindle 64 is precisely controlled by using spur gearing in the housing 14. These gears are shaved and alternately crowned so that a minimum of backlash occurs in the gear train. The linear movement of the cable core 320 is maintained at a constant rate and, therefore, the spacing of the strands upon winding may be altered by changing gears between the motor and the spindle. This spacing can be controlled to .0002 of an inch and to suit the requirements of the product cable.

Tension in the individual strands 330 is controlled by the tension rings 268. In operation, the multi-bobbin spindle 64 rotates and tension on the individual strand 330 is accomplished as the corresponding tension ring 268 is centrifugally urged outwardly against the inner shoe upon which it is mounted. The weight of the ring and speed of its rotation about the axis of the spindle causes a definite drag to exist on the strand 330 which is looped at least once around the ring. This tension is due solely to the frictional drag between the shoe 266 and the tension ring mounted thereon as all tension is relieved between the bobbins and the tension rings. The peripheral groove 270 in each of the tension rings is such as to prevent snarling and over-riding. If the strand tension needs adjustment by virtue of a change in the weight or material of a given strand the tension ring may be properly weighted and this alone will given the required results.

The cable core 320 is supported at one side of the wind point or space 260 by the balls 256. These balls are arranged to be urged against the cable core 320 in a plane perpendicular to the cable and by action of the coil spring 246. In operation, the balls 256 maintain support and follow the helical lead of the cable core much the same as a screw nut following threads. There is little wear involved as the balls roll in the plane perpendicular to the cable and do not rub along and on the cable. At the other side of the wind point or space 260 the larger balls 278 operate in a similar manner but rotate in the opposite direction about the cable 322 as the outer layer is reversed in the direction of the winding. Each machine of a series is adapted to wind its layer in only one direction. The core 320 forms a natural cone of winding for the helix angle of this cone is due to the spacing rate or rate of feed of the cable core 320 and the tension in the individual strands 330 is due to the tension ring drag. In operation of the machine the space 260 between the guide members 220 and 250 can be seen through the slots 260 and the cone of strands defined by the individual strands 330 touches no guiding parts of the machine. With no guides involved in touching the strands 330 during the winding there is nothing to wear out in the space 260.

In understanding the over-all operation it will be appreciated that the core cable 320 is introduced between the guide wheels 100 and fed through the tube 82 (FIGURE 12), the aperture 120, the tube 84 and through the sleeves or plungers 244 and 214 and then is looped around the capstan 26 and through the cable straightening machine 28 to the windup spool 36. As the core cable 320 is thus fed the individual strands 330 from the six bobbins are fed over the tension rings 268 and six of these individual strands are wound in one direction about the cable core 320 in the observable winding space of the winding head. The pressure of the straightening machine 28 is preferable but experience has shown that such a machine is not necessary.

It will be appreciated that in starting or stopping the machine the bobbins 142 cannot be freely rotatable with respect to the sleeve 46 as the strands 330 must be controlled. The free rotation may be prevented by the solenoid 108. When the latter is energized it serves to move the yoke 94 and the tube 82 to the right as viewed in FIGURE 12 and for a distance in the nature of a few thousandths of an inch. Such movement is transferred to the annulus 80 by the key member 78 and this results in pressing the coaxially arranged bronze bushings 134 and steel rings 132 together and into frictional engagement. This braking action is essential in order properly to retain the individual strands 330 in their wound condition on the bobbins. When the solenoid 108 is not energized, the bobbins 142 rotate freely and with their bronze bearings 134 on the sleeve 46.

The oil mist provisions permit high volume production without undue friction and stresses or strains in the machine parts or in the individual strands 330.

The peculiar construction of the block 16 heretofore referred to as being analogous to a tail stock arrangement permits withdrawal of the hollow shaft 192 and the end disc 68 to positions illustrated in FIGURE 12a. Because of this arrangement, the bobbins 142 may be removed from the sleeve 46 and reloaded with wire or strands preparatory to a subsequent long and continuous run of operation. Each bobbin may be removed from the bushings 134 and the sleeve 46 by inserting an instrument in the aperture 148 of the bobbin and depressing the spring 154. With the spring 154 depressed, each bobbin may be moved axially and free of its locking or key block 156 and then rotated 180 degrees to hold the spring 154 depressed. The bobbins 142 may then be pulled off the sleeve 46 and the bronze bushings assembly. These steps, when taken in reverse order permit quick loading of the machine. The purpose of the straight slots 150 in the bushings 134 diametrically opposed to the springs 154 is to facilitate bobbin removal and reloading. Assuming that five bobbins have been removed from the spindle 64, the spring 154 serving the last bobbin iis depressed. That bobbin is then moved axially to disengage it from its key block 156 and then rotated 180 degrees The bobbin then may be pulled off the spindle with the unimpeded slot 150 of that bobbin permitting the movement despite the key blocks 156 of the other bushings 134.

It should be noted that when the bobbins are removed for refill the adjustment for individual strand tension and the lubrication are not disturbed. Also coils on the bobbins are controlled during starting and stopping of the spindle when the tension rings 268 are not active. An electronic switch may easily be installed so that a broken wire will stop the machine. A work production rate of from 12 to 15 feet per minute of flexible cable composed of four layers of wire strands over a central wire or nylon core may be maintained for a considerable period before reloading is necessary.

I claim:

1. A flexible cable winding machine having a cable winding head through which a cable core may be fed longitudinally and under tension, a spindle mounted for rotation coaxially with said head, multiple bobbins for holding strands to be wound on said core, said bobbins being journaled on said spindle for rotation around the axis of the latter, and multiple tension rings mounted on said spindle in spaced relation with said head and in planes intersecting along the axis of said head and spindle, each of said tension rings comprising an annulus of a weight determinative of tension to be placed in one of said strands during winding.

2. A flexible cable winding machine having a cable winding head through which a cable core may be fed longitudinally and under tension, a spindle mounted for rotation and coaxial with said head, multiple bobbins for holding strands to be wound, said bobbins being journaled on said spindle for rotation around the axis of the latter, an end plate forming a part of said spindle, multiple tension rings mounted on said end plate and in spaced relation with said head, and each of said tension rings comprising an annulus of a weight determinative of tension to be placed in one of said strands during winding.

3. A flexible cable winding machine as set forth in claim 2, said end plate having a fixed bearing arrangement for each of said tension rings, said bearing arrangement and its associated tension ring having arcuate facing surfaces which are relatively slidable, and the centrifugal force exerted by said ring on said bearing arrangement being adapted to control said strand tension.

4. A flexible cable winding machine as set forth in claim 1, each of said tension rings being located with respect to said head so that strands guided from said bobbins and around said tension rings to said head are adapted to describe a cone converging in the direction of feed of said cable core.

5. A flexible cable winding machine having a cable winding head through which a cable core may be fed longitudinally and under tension, a spindle holding multiple bobbins and rotatable on the axis of said winding head for directing tensioned strands from said spindle in paths describing a cone converging on said core, said winding head including a sleeve coaxial and rotatable with said spindle, radial passages in said sleeve and adapted freely to accommodate strands fed in said paths to guide units retained in said sleeve, said guide units defining coaxial passages for said cable core and being spaced at the apex of said cone of strands freely to receive said strands between them, balls retained in each of said guide units adjacent to said apex, and means resiliently urging said balls toward the common axis of said guide unit passages.

6. A flexible cable winding machine such as set forth in claim 5, said means resiliently urging said balls comprising plungers including sleeves movable away from said cone of strands, and spring means arranged to counteract said movement.

7. A flexible cable winding machine as set forth in claim 5, the said radial sleeve passages and the space between said guide units being arranged to expose said cone of tensioned strands between said guide units to view.

8. A flexible cable winding machine as set forth in claim 5, said guide units being retained in said sleeve by detent means and positive stops.

9. A flexible cable winding machine having a cable winding head through which a cable core may be fed longitudinally and under tension, a spindle mounted for rotation and coaxial with said head, multiple bobbins for holding strands to be wound, said bobbins being journaled on said spindle for rotation around the axis of the latter, multiple tension rings mounted on said spindle in planes intersecting along the axis of said head and spindle, a housing enclosing said spindle, head and tension rings, and means for introducing and discharging an oil mist into and out from said housing whereby parts of said machine and said strands may be lubricated during a cable winding operation.

10. A flexible cable winding machine as set forth in claim 9, the said spindle and bobbins cooperating in defining passages whereby said oil mist may be applied to lubricate said bobbins, and said strands being spaced in said housing freely to receive lubrication by said oil mist.

11. A flexible cable winding machine such as set forth in claim 9, said spindle being mounted in bearings spaced outwardly from one end of said spindle, and means for conveying said oil mist to said spindle bearings.

12. A flexible cable winding machine having a cable winding head through which a cable core may be fed longitudinally and under tension, a spindle mounted for rotation and coaxial with said head, multiple bobbins for holding strands to be wound on said cable core, said bobbins being retained on said spindle and keyed thereto for rotation therewith, a sleeve rotatably supported at one end by fixed journaled means and by movable journal means at the other end as a support for said spindle, an arcuate recess in each of said bobbins adapted to register with an arcuate recess in said sleeve, and leaf spring means retained by said arcuate recesses thereby supplying axial holding means between said sleeve and bobbins.

13. A flexible cable winding machine as set forth in claim 12, each bobbin having an aperture to receive a tool for depressing said spring means thereby axially to release said bobbin from said spindle.

14. A flexible cable winding machine as set forth in claim 12, bronze bushings on said sleeve, each of said bobbins being mounted on one of said bushings and having a straight slot facing said one bushing, key means fixed to said spindle and extending into said slot for driving said bobbin upon rotation of said sleeve.

15. A flexible cable winding machine having a cable winding head through which a cable core may be fed longitudinally while under tension, a spindle coaxial with said winding head and mounted for rotation about the axis of said winding head, multiple bobbins rotatable with said spindle for holding individual strands to be wound on said cable core in said winding head, a sleeve supporting said spindle and winding head and being rotatively supported at one end by fixed journal means and by axially movable journal means at the other end, a bushing on said sleeve for each one of said bobbins, an arcuate recess in said bushing, an arcuate recess in said one bobbin adapted to register with said recess in said bushing, spring means retained by said arcuate recesses for holding said bushing and corresponding bobbin in a predetermined axial relation, key means for transmitting rotation of said bushing to said bobbin, and the arrangement being such that axial movement of said journal means at said other end of said spindle accommodates installation and removal of said bobbins from said spindle.

16. A flexible cable winding machine having a cable winding head through which a cable core may be fed longitudinally and under tension in a linear path, a spindle mounted for rotation coaxially with said winding head, a housing enclosing said spindle, multiple bobbins for holding individual strands to be wound in one layer on said core, said bobbins being journaled on said spindle for rotation around the axis of the latter, means for directing said strands from said spindle in paths describing a cone converging on said core within said winding head, the latter comprising coaxial guide units spaced apart at the apex of said cone of strands, each of said guide units including resilient means for retaining and guiding said core in said linear path, and means for directly applying an oil mist to said strands in said housing and indirectly lubricating said strands between said guide units.

17. A flexible cable winding machine having a cable winding head through which a cable core may be fed under tension, a spindle mounted for rotation with said winding head, multiple bobbins for holding individual strands to be wound on said core, said bobbins being journaled on said spindle for rotation and having the same axis as the spindle and said head, centrifugally operated means on the spindle for automatically determining tension in said strands, and said winding head being located at one end of said spindle.

18. A flexible cable winding machine as set forth in claim 17 in which said winding head is located with respect to said spindle to form a cone of individual strands converging within said winding head clear of all parts of said machine, and means for controlling the rate of feed of said core simultaneous with the centrifugal control of the tension of said strands in order to determine the helix angle of said cone thereby to minimize wear.

19. A flexible cable winding machine having a cable winding head through which a cable core may be fed in a linear path under tension, a sleeve and a multi-bobbin spindle coaxial with said winding head and adapted to be power rotated around said linear path, multiple bushings on said sleeve, multiple bobbins intermediate the length of said spindle with each being supported on one of said bushings, a key and slot arrangement adapted to hold each bobbin and its corresponding bushing in non-rotative relation, and releasable means for holding said bobbin and bushing against relative linear sliding movement.

20. A flexible cable winding machine as set forth in claim 19, floating steel rings alternating with said bushings along said sleeve, and means for locking and unlocking said steel rings and bushings together by axial displacement along said sleeve.

21. A flexible cable winding machine as set forth in claim 19, floating steel rings alternating with said bushings along the length of said sleeve, and said releasable means comprising a spring retained in registering grooves of said bobbin and bushing.

References Cited in the file of this patent

UNITED STATES PATENTS

| | | |
|---|---|---|
| 334,709 | Kruesi et al. | Jan. 19, 1886 |
| 488,227 | Sisum | Dec. 20, 1892 |
| 1,847,453 | Webb | Mar. 1, 1932 |
| 1,934,026 | Angell et al. | Nov. 7, 1933 |
| 2,006,333 | Angell et al. | July 2, 1935 |
| 2,123,936 | Dreyfus et al. | July 19, 1938 |
| 2,277,102 | Henning et al. | Mar. 24, 1942 |
| 3,043,926 | Rabeux et al. | July 10, 1962 |

FOREIGN PATENTS

| | | |
|---|---|---|
| 68,139 | Germany | Oct. 2, 1892 |